(12) United States Patent
Yagi

(10) Patent No.: US 12,161,099 B2
(45) Date of Patent: Dec. 10, 2024

(54) FISHING LURE

(71) Applicant: GLOBERIDE, Inc., Tokyo (JP)

(72) Inventor: Hiroshi Yagi, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 13 days.

(21) Appl. No.: 18/114,808

(22) Filed: Feb. 27, 2023

(65) Prior Publication Data

US 2023/0270090 A1 Aug. 31, 2023

(30) Foreign Application Priority Data

Feb. 28, 2022 (JP) .................. 2022-029097

(51) Int. Cl.
*A01K 85/01* (2006.01)
*A01K 85/00* (2006.01)

(52) U.S. Cl.
CPC ........ *A01K 85/012* (2022.02); *A01K 85/1847* (2022.02)

(58) Field of Classification Search
CPC ........................ A01K 85/012; A01K 85/1847
See application file for complete search history.

(56) References Cited

U.S. PATENT DOCUMENTS

| | | | | |
|---|---|---|---|---|
| 2,547,240 A | * | 4/1951 | Young .................. | A01K 85/14 43/42.34 |
| 2,765,571 A | * | 10/1956 | Sinclair ................ | A01K 85/16 43/42.34 |
| 3,614,199 A | * | 10/1971 | Altman ................ | G03B 21/08 359/540 |
| 3,801,183 A | * | 4/1974 | Sevelin ............... | G06K 19/14 359/537 |
| 4,293,189 A | * | 10/1981 | Morikawa ........... | G02B 5/128 359/535 |
| 4,862,631 A | * | 9/1989 | Wilson ............... | A01K 85/16 43/42.33 |
| 5,962,121 A | * | 10/1999 | Mori .................. | G02B 5/128 428/323 |

(Continued)

FOREIGN PATENT DOCUMENTS

JP H09154438 A 6/1997
JP H1175628 A 3/1999

(Continued)

OTHER PUBLICATIONS

Extended European Search Report for related European Application No. 23158056.4; action dated Jul. 13, 2023; (10 pages).

(Continued)

*Primary Examiner* — Richard G Davis
(74) *Attorney, Agent, or Firm* — Oliff PLC

(57) ABSTRACT

A fishing lure according to an embodiment of the disclosure comprises a main body portion having an interior portion provided with a cavity. The cavity is partially or completely visible from outside. At least one high refractive index glass bead and/or at least one specular bead capable of reflecting external light is disposed in an outer surface of the main body portion, in an inner surface of the main body portion, and/or inside the cavity. The external light is reflected by the at least one high refractive index glass bead and/or the at least one specular bead disposed in the outer surface, in the inner surface, and/or inside the cavity.

8 Claims, 7 Drawing Sheets

(56) References Cited

U.S. PATENT DOCUMENTS

| | | | |
|---|---|---|---|
| 2016/0000057 A1* | 1/2016 | Mistilis | A01K 85/01 43/42.12 |
| 2021/0274762 A1 | 9/2021 | Yagi et al. | |

FOREIGN PATENT DOCUMENTS

| | | | |
|---|---|---|---|
| JP | 2000201577 A | | 7/2000 |
| JP | 2005192471 A | | 7/2005 |
| JP | 3738105 B2 | * | 1/2006 |

OTHER PUBLICATIONS

Nov. 23, 2023 Office Action issued in Taiwanese Patent Application No. 112105664.

May 21, 2024 Office Action issued in Taiwanese Application No. 112105664.

* cited by examiner

FISHING LURE

CROSS-REFERENCE TO RELATED APPLICATION

This application claims priority under 35 U.S.C. § 119 to Japanese Patent Application No. 2022-029097 filed on Feb. 28, 2022 in the Japanese Patent Office, the entire contents of which is hereby incorporated by reference.

FIELD

The present disclosure relates to a fishing lure.

BACKGROUND

In the related art, artificial baits (lures), or baits mimicking small fish, are used in lure fishing to catch fish eaters. There are various types of known lures such as Egi lures, spoons, plugs, spinners, jigs, and plastic lures.

As an example of lures, JP H11-75628 A discloses a fish attracting tool such as an artificial bait used in fishing. Particularly, in this fish attracting tool, an object that reflects light rays (a reflector) is sealed together with a liquid in a tool body, and the reflector generates complexly reflected light by making a movement, thereby increasing fishing results.

In addition, JP H9-154438 A discloses a color-developing lure in which a pair of halved lure members including a transparent or translucent material is bonded at an interval so that the lure has a hollow interior portion. Each halved lure member has an inner surface provided with a diffusely reflecting layer having a large number of irregularities, a front surface of the diffusely reflecting layer is provided with a reflecting film, and the lure has an outer surface provided with a smooth layer.

SUMMARY

Although a fish attracting tool as in JP H11-75628 A reflects light, the reflected light is weak or does not even reach a fish eater depending on angles of light shined on a small piece of the tool from the outside, and the fish attracting tool does not necessarily enhance the fish attracting effect. This is a problem that remains to be solved. Even a color-developing lure as in JP H9-154438 A merely causes diffusely reflected light. Since the reflected light is diffused, the light is not strong. For that reason, the lure is hard for fish eaters to notice and does not necessarily enhance the fish attracting effect.

An object of an embodiment of the disclosure is to provide a lure capable of attracting fish eaters more reliably and strongly with an easy formation technique at low cost by reducing attenuation in reflection of external light from the lure to cause light reflected in multi directions at higher luminance. Other objects of the embodiment of the disclosure will be clearly understood by referring to the entirety thereof.

A fishing lure according to an embodiment of the disclosure comprises a main body portion having an interior portion provided with a cavity and having at least one high refractive index glass bead and/or at least one specular bead (at least one of "one or more high refractive index glass beads" and "one or more specular beads") capable of reflecting external light, the cavity being partially or completely visible from outside, the at least one high refractive index glass bead and/or the at least one specular bead being disposed in an outer surface of the main body portion, in an inner surface of the main body portion, and/or inside the cavity, and the at least one high refractive index glass bead and/or the at least one specular bead disposed in the outer surface, in the inner surface, and/or inside the cavity being configured to reflect the external light.

In the fishing lure according to an embodiment of the disclosure, in a case where the at least one high refractive index glass bead and/or the at least one specular bead (at least one of "one or more high refractive index glass beads" and "one or more specular beads") is disposed in the outer surface of the main body portion and/or the inner surface of the main body portion, a coating material containing the at least one high refractive index glass bead and/or the at least one specular bead is disposed in the outer surface and/or the inner surface.

In the fishing lure according to an embodiment of the disclosure, in a case where the at least one high refractive index glass bead and/or the at least one specular bead (at least one of "one or more high refractive index glass beads" and "one or more specular beads") is disposed in the outer surface of the main body portion and/or the inner surface of the main body portion, a tape member containing the at least one high refractive index glass bead and/or the at least one specular bead is attached to the outer surface and/or the inner surface.

In the fishing lure according to an embodiment of the disclosure, in a case where the at least one high refractive index glass bead and/or the at least one specular bead (at least one of "one or more high refractive index glass beads" and "one or more specular beads") is disposed inside the cavity, the at least one high refractive index glass bead and/or the at least one specular bead is enclosed in the cavity.

In the fishing lure according to an embodiment of the disclosure, in a case where the at least one high refractive index glass bead and/or the at least one specular bead (at least one of "one or more high refractive index glass beads" and "one or more specular beads") is disposed inside the cavity, a bead holding member is disposed inside the cavity, and a coating material containing the at least one high refractive index glass bead and/or the at least one specular bead is applied or a tape member containing the at least one high refractive index glass bead and/or the at least one specular bead is attached to a front surface of the bead holding member.

In the fishing lure according to an embodiment of the disclosure, in a case where a coating material containing the at least one high refractive index glass bead and/or the at least one specular bead (at least one of "one or more high refractive index glass beads" and "one or more specular beads") is applied, the at least one high refractive index glass bead and/or the at least one specular bead is partially exposed on a resin layer of the coating material or embedded in the resin layer of the coating material.

In the fishing lure according to an embodiment of the disclosure, in a case where a tape member containing the at least one high refractive index glass bead and/or the at least one specular bead (at least one of "one or more high refractive index glass beads" and "one or more specular beads") is attached, the at least one high refractive index glass bead and/or the at least one specular bead is partially exposed on a resin layer of the tape member or embedded in the resin layer of the tape member.

In the fishing lure according to an embodiment of the disclosure, the high refractive index glass bead is a spherical reflective bead having a refractive index of from 1.4 to 2.6. In the fishing lure according to an embodiment of the disclosure, the high refractive index glass bead is formed by soda lime glass, Vycor glass, quartz glass, Pyrex (registered trademark) glass, borosilicate glass, or titanium barium glass.

In the fishing lure according to an embodiment of the disclosure, the specular bead has a tetrahedral, hexahedral, octahedral, dodecahedral, or icosahedral shape.

In the fishing lure according to an embodiment of the disclosure, the specular bead is formed by soda lime glass, Vycor glass, quartz glass, Pyrex (registered trademark) glass, borosilicate glass, titanium barium glass, ABS resin, or acrylic resin.

According to various embodiments of the disclosure, there is provided a lure capable of attracting fish eaters more reliably and strongly with an easy formation technique at low cost by reducing attenuation in reflection of external light from a plurality of parts of the lure to cause light reflected in multi directions at higher luminance.

DETAILED DESCRIPTION

Figure 1:
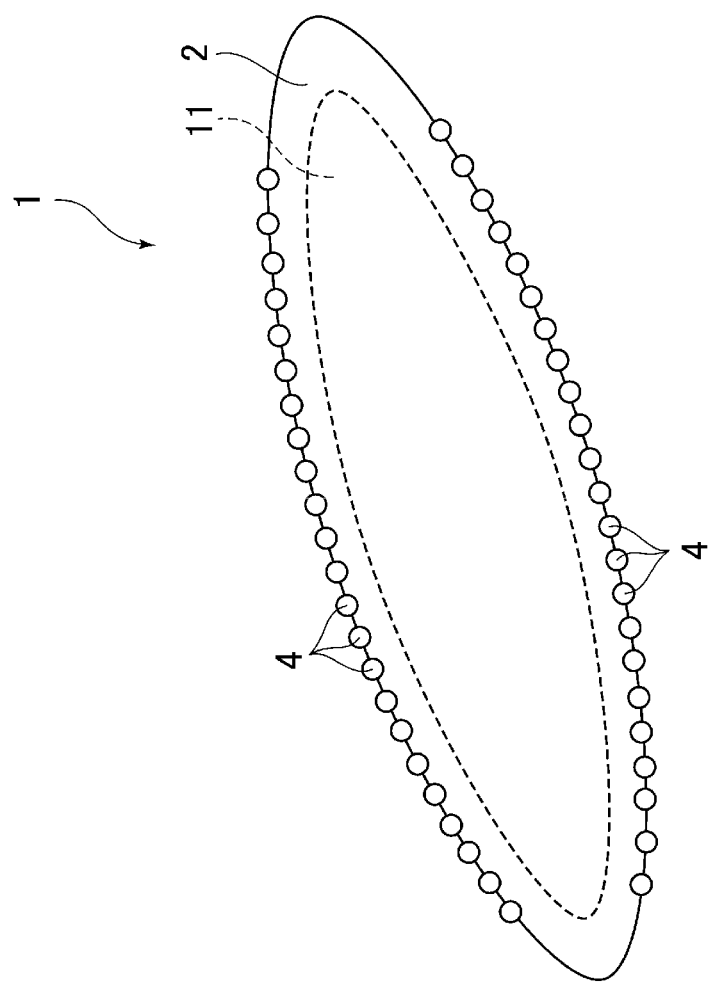
FIG. 1 is a perspective view of a fishing lure 1 according to an embodiment of the disclosure.

Hereinafter, various embodiments of the present disclosure will be described with reference to the drawings as appropriate. Note that common components in the drawings are denoted by the same reference numerals.

A fishing lure 1 according to an embodiment of the disclosure will be described with reference to FIGS. 1 to 4. The fishing lure 1 according to an embodiment of the disclosure comprises a main body portion 2 having an interior portion provided with a cavity (cavity portion) 11 that is partially or completely visible from outside and comprising at least one high refractive index glass bead and/or at least one specular bead 4 (at least one of "one or more high refractive index glass beads" and "one or more specular beads") capable of reflecting external light. At least one high refractive index glass bead and/or at least one specular bead 4 (the reference numeral 4 is used for convenience sake, collectively representing at least one high refractive index glass bead and/or at least one specular bead (which is standardized throughout this specification)) is disposed in an outer surface of the main body portion 2, in an inner surface of the main body portion 2, and/or inside the cavity 11. The external light is reflected by at least one high refractive index glass bead and/or at least one specular bead 4 disposed in the outer surface, in the inner surface, and/or inside the cavity 11. In the drawings, the high refractive index glass bead or specular bead 4 is illustrated as a circular bead for convenience sake, but the drawings are not intended to determine nor to limit the shape of the bead (which is standardized throughout this specification).

In an example shown in FIG. 1, the fishing lure 1 according to an embodiment of the disclosure comprises the main body portion 2 having the interior portion provided with the cavity (cavity portion) 11 that is partially or completely visible from outside and comprising at least one high refractive index glass bead and/or at least one specular bead 4 (at least one of "one or more high refractive index glass beads" and "one or more specular beads") capable of reflecting external light. At least one high refractive index glass bead and/or at least one specular bead 4 is disposed in the outer surface of the main body portion 2. The external light is reflected by at least one high refractive index glass bead and/or at least one specular bead 4. In this manner, it possible to provide a lure capable of attracting fish eaters more reliably and strongly with an easy formation technique at low cost by reducing attenuation in reflection of external light from a plurality of parts of the lure to cause light reflected in multi directions at higher luminance. In a case where at least one high refractive index glass bead and/or at least one specular bead 4 is disposed in the outer surface of the main body portion 2, the fishing lure 1 is not necessarily provided with the cavity 11.

Figure 2:
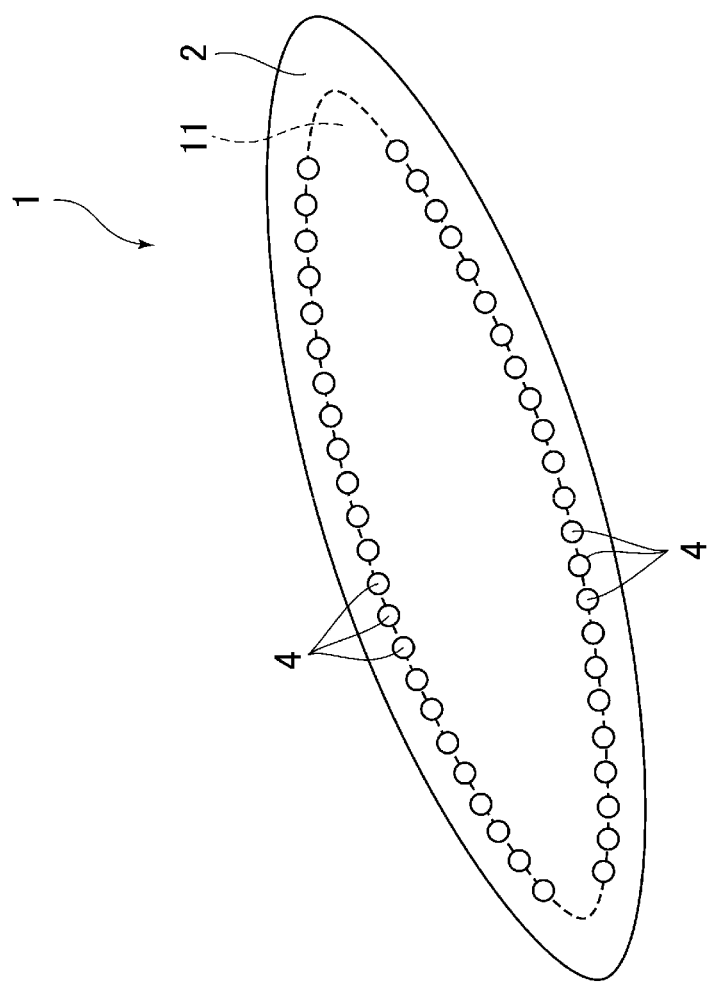
FIG. 2 is a perspective view of a fishing lure 1 according to an embodiment of the disclosure.

In an example shown in FIG. 2, the fishing lure 1 according to an embodiment of the disclosure comprises the main body portion 2 having the interior portion provided with the cavity (cavity portion) 11 that is partially or completely visible from outside and comprising at least one high refractive index glass bead and/or at least one specular bead 4 (at least one of "one or more high refractive index glass beads" and "one or more specular beads") capable of reflecting external light. At least one high refractive index glass bead and/or at least one specular bead 4 is disposed in the inner surface of the main body portion 2. The external light is reflected by at least one high refractive index glass bead and/or at least one specular bead 4. In this manner, it possible to provide a lure capable of attracting fish eaters more reliably and strongly with an easy formation technique at low cost by reducing attenuation in reflection of external light from a plurality of parts of the lure to cause light reflected in multi directions at higher luminance.

In addition, in the fishing lure 1 according to an embodiment of the disclosure, in a case where at least one high refractive index glass bead and/or at least one specular bead 4 (at least one of "one or more high refractive index glass beads" and "one or more specular beads") is disposed in the outer surface of the main body portion 2 and/or the inner surface of the main body portion 2, a coating material containing at least one high refractive index glass bead and/or at least one specular bead 4 is applied to the outer surface and/or the inner surface (to be described in detail). In this manner, applying the coating material facilitates formation of the high refractive index glass bead and/or the specular bead 4 contained in the coating material in desired positions.

In addition, in the fishing lure 1 according to an embodiment of the disclosure, in a case where at least one high refractive index glass bead and/or at least one specular bead 4 (at least one of "one or more high refractive index glass beads" and "one or more specular beads") is disposed in the outer surface of the main body portion 2 and/or the inner surface of the main body portion 2, a tape member containing at least one high refractive index glass bead and/or at least one specular bead 4 is attached to the outer surface and/or the inner surface (to be described in detail). In this manner, using the tape member facilitates formation of at least one high refractive index glass bead and/or at least one specular bead 4 contained in the tape member in desired positions.

Figure 3:
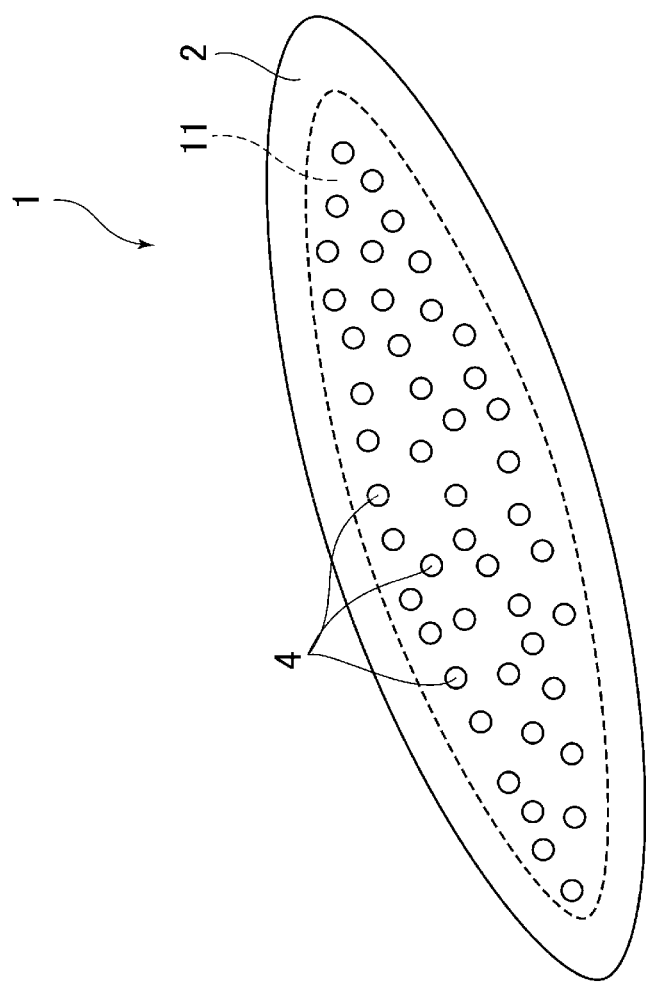
FIG. 3 is a perspective view of a fishing lure 1 according to an embodiment of the disclosure.
Figure 4:
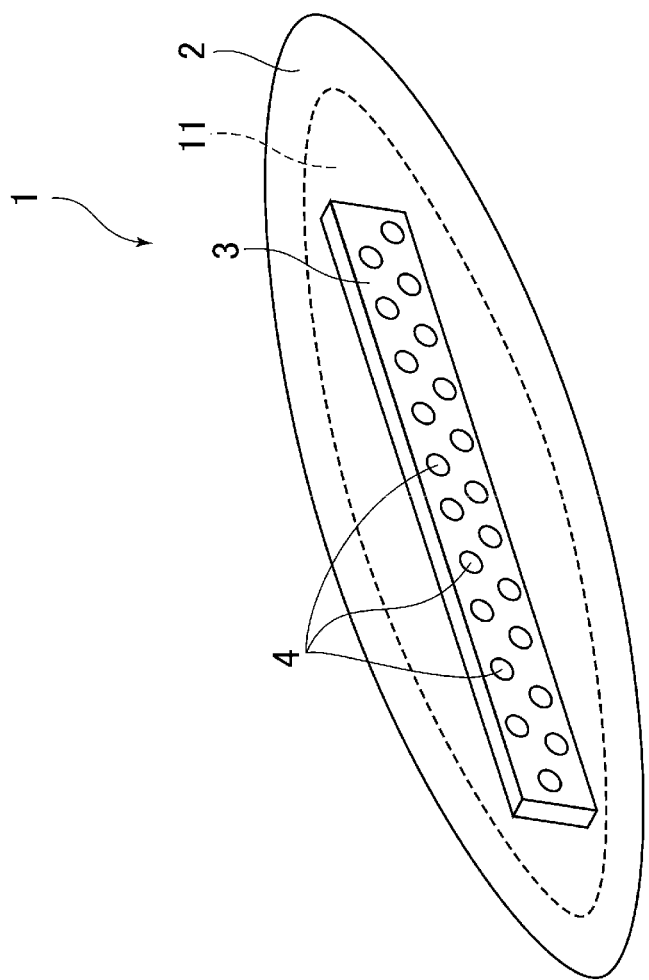
FIG. 4 is a perspective view of a fishing lure 1 according to an embodiment of the disclosure.

Next, in examples shown in FIGS. 3 and 4, the fishing lure 1 according to an embodiment of the disclosure comprises the main body portion 2 having the interior portion provided with the cavity (cavity portion) 11 that is partially or completely visible from outside and comprising at least one high refractive index glass bead and/or at least one specular bead 4 (at least one of "one or more high refractive index glass beads" and "one or more specular beads") capable of reflecting external light. At least one high refractive index glass bead and/or at least one specular bead 4 is disposed inside the cavity 11. The external light is reflected by at least one high refractive index glass bead and/or at least one specular bead 4. In this manner, it possible to provide a lure capable of attracting fish eaters more reliably and strongly with an easy formation technique at low cost by reducing attenuation in reflection of external light from a plurality of parts of the lure to cause light reflected in multi directions at higher luminance. In a process in which the external light is specularly reflected by at least one high refractive index glass bead and/or at least one specular bead 4 disposed inside the cavity 11, the external light partially passes through the main body portion 2 and is scattered when entering the cavity 11. Since incident light entering the cavity 11 is scattered in multi directions, most of the incident light is specularly reflected by at least one high refractive index glass bead and/or at least one specular bead 4 inside the cavity 11, which causes light reflected in a wider range of directions (examples shown in FIGS. 3 and 4).

In the fishing lure according to an embodiment of the disclosure, the high refractive index glass bead is a spherical reflective bead having a refractive index of from 1.4 to 2.6 (the range includes 1.4 and 2.6, which is standardized throughout this specification). The high refractive index glass bead is a high refractive index glass bead, and the bead is a perfect sphere, acting as a kind of convex lens. External light incident on the bead is refracted by an interface of the bead and is focused on one point, reflected by the bottom of the sphere, refracted again on the interface through the sphere, and sent out (that is, the high refractive index glass bead refracts externally incident light twice and reflects once, and then, sends the light out). The high refractive index glass bead is formed by soda lime glass, Vycor glass, quartz glass, Pyrex (registered trademark) glass, borosilicate glass, or titanium barium glass. The high refractive index glass bead is not limited in material since the bead is formed by abrasion of waste glass with a hard abrasive or abrasive liquid. Having a refractive index of from 1.4 to 2.6, the high refractive index glass bead which is a spherical reflective bead enables high intensity light including retroreflection.

Figure 7:
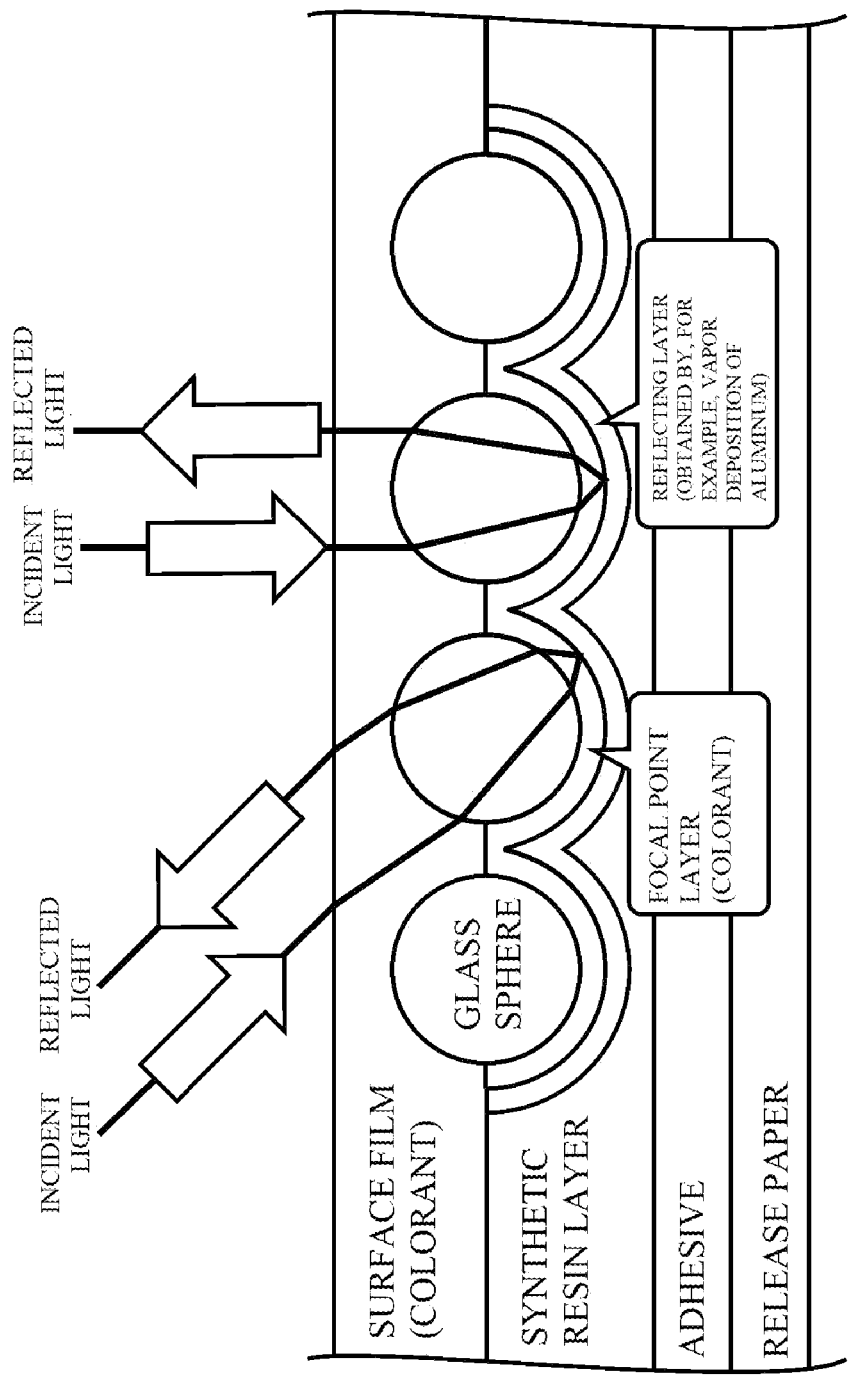
FIG. 7 is a view for describing an aspect of reflection of a high refractive index glass bead in a fishing lure 1 according to an embodiment of the disclosure.

To enhance the reflection in the high refractive index glass bead, as shown in FIG. 7, a focal point (a focal point layer in an example illustrated in the drawing) includes a reflecting layer such as a metal (a reflecting layer obtained by vapor deposition of aluminum in the illustrated example). Such a configuration sends stronger light outside the bead. In this manner, utilizing the behavior of the spherical lens, that is, a difference in refractive index between glass (or plastic or the like) and air, the high refractive index glass bead (such as a spherical glass bead) refracts external light and allows the light to converge, and then, reflects the light by the inside of an outer surface of the bead or by the reflecting layer (obtained by vapor deposition of aluminum, painting, or a reflecting sheet material) disposed on the back surface of the outer surface for enhancing reflection efficiency, thereby sending the light out. A focal length is determined by the refractive index of a material included in the spherical lens (with a focal point layer, a focal length is determined by the refractive index of this medium) which has a refractive index within a range of n=1.4 to 2.6. However, in a case where a focal point is outside the bead outer surface, a focal layer may be disposed between the bead outer surface and the reflecting layer to make reflected light retroreflected light. Note that a surface film, a synthetic resin layer, an adhesive, and a release paper shown in FIG. 7 are illustrated for convenience sake in describing the configuration of a retroreflective layer and are not necessarily essential.

In the fishing lure 1 according to an embodiment of the disclosure, the high refractive index glass bead has a spherical shape and the specular bead has a tetrahedral, hexahedral, octahedral, dodecahedral, or icosahedral shape (including a regular tetrahedral, regular hexahedral, regular octahedral, regular dodecahedral, or regular icosahedral shape) (polyhedral bead). In a case where a plurality of specular beads 4 is used, at least two of the above shapes may be employed. The specular bead is formed by, but not limited to, injection molding using glass materials such as soda lime glass, Vycor glass, quartz glass, Pyrex (registered trademark) glass, borosilicate glass, and titanium barium glass or resin such as ABS resin and acrylic resin.

In a case where the specular bead includes a transparent material, external light incident on the bead is reflected once or twice and sent out with high intensity. The specular bead is formed by various types of glass materials or resin such as ABS and acrylic resin. For example, the specular bead is easily formed by, but not limited to, injection molding using ABS or acrylic resin.

Herein, the term "specular reflection" is defined as "reflection that obeys the law of reflection (that is, the angles of incidence and reflection are equal but opposite in sign)". Since specularly reflected light typically has higher luminance than diffusely reflected light, it is known that specular reflection of external light significantly increases the intensity of the reflected light, which results in long-distance transmission of the reflected light (the same applies hereinafter). Specular reflection and diffuse reflection vary in luminance with various conditions, but under the same condition, the luminance of diffuse reflection is approximately $1/5$ or less of that of specular reflection. In the disclosure, note that "specular reflection" does not only include ideal specular reflection but also includes reflection having luminance equal to 40% or more of the luminance of ideal specular reflection (referred to as "quasi specular reflection" herein).

External light enters from various directions, and an example of the external light is primarily sunlight that reaches underwater from above the surface of water. Such external light (incident light) enters an underwater lure in an up and down (vertical) or oblique direction from above the surface of water. To attract fish eaters, it is desirable that the lure reflects light specularly roughly in a right and left (lateral) or oblique lateral direction of the lure. In this regard, the lure is designed to make a predetermined movement during actual fishing. In a case where the lure includes a high refractive index glass bead or a specular bead, the bead may be disposed in appropriate positions, considering a possible movement of the lure (also referred to as a lure action) in advance, but the bead is not particularly limited in position and orientation. A large number of specular beads enable multidirectional specular reflection and enhance reflection efficiency of incident light in an appropriate range (direction). However, it is noteworthy that even a lure with a single reflecting member efficiently reflects light in an appropriate range (direction) as long as the lure action is rolling.

In the fishing lure 1 according to an embodiment of the disclosure, in a case where at least one high refractive index glass bead and/or at least one specular bead 4 (at least one of "one or more high refractive index glass beads" and "one or more specular beads") is disposed inside the cavity 11, at least one high refractive index glass bead and/or at least one specular bead 4 is enclosed in the cavity 11 (an example shown in FIG. 3). In this case, at least one high refractive index glass bead and/or at least one specular bead 4 is enclosed in the cavity 11 in a freely movable manner. In this manner, it is possible to reflect light in a wider range of directions.

In the fishing lure according to an embodiment of the disclosure, in a case where at least one high refractive index glass bead and/or at least one specular bead 4 (at least one of "one or more high refractive index glass beads" and "one or more specular beads") is disposed inside the cavity, a bead holding member 3 is disposed inside the cavity, and a coating material containing at least one high refractive index glass bead and/or at least one specular bead 4 is applied (an example shown in FIG. 4) or a tape member containing at least one high refractive index glass bead and/or at least one specular bead 4 is attached to a front surface of the bead holding member 3. In this case, at least one high refractive index glass bead and/or at least one specular bead 4 is disposed in the bead holding member 3 supported inside the cavity 11, so that it is possible to place the bead in a desired position. In this manner, it is possible to reflect light in a specific range of directions.

In a case where the fishing lure is provided with the bead holding member 3, the bead holding member 3 and the main body portion 2 may be integrated or separated (which is standardized throughout this specification). Even in a case where the bead holding member 3 and the main body portion 2 are separated, all or part of the bead holding member 3 may be in contact with the main body portion 2 (which is standardized throughout this specification).

Figure 5A:
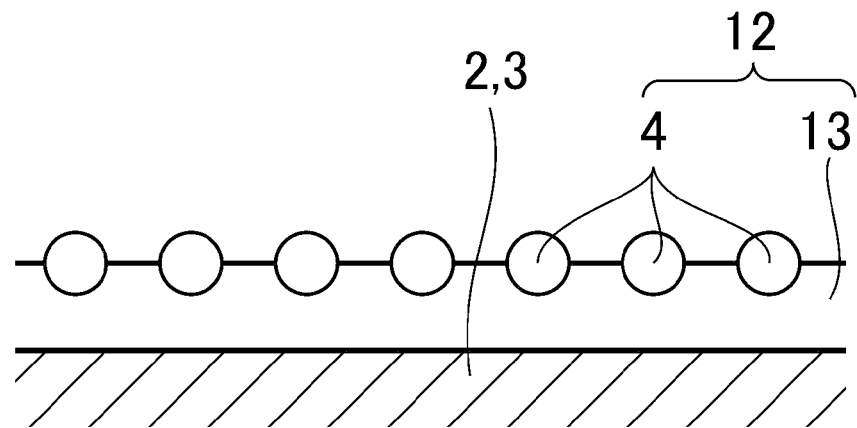
FIGS. 5A and 5B are views for describing a coating material in a fishing lure 1 according to an embodiment of the disclosure.
Figure 5B:
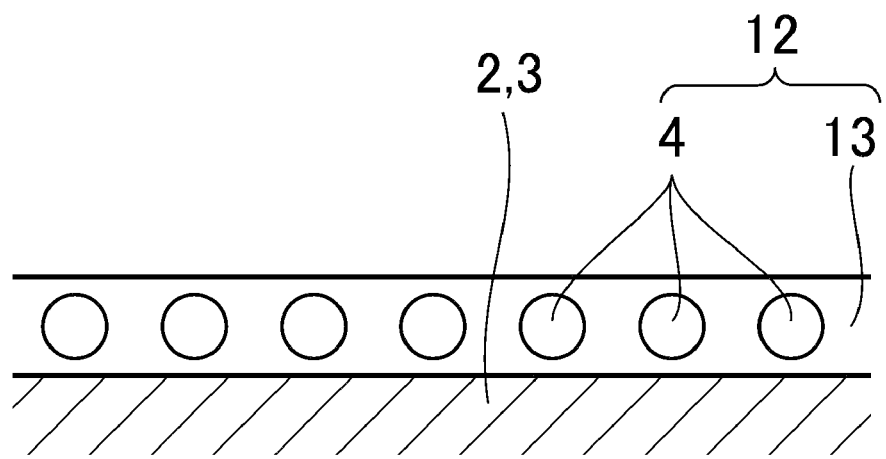

With reference to FIGS. 5A and 5B, hereinafter described is a coating material 12 containing at least one high refractive index glass bead and/or at least one specular bead. In the fishing lure 1 according to an embodiment of the disclosure, in a case where the coating material 12 containing at least one high refractive index glass bead and/or at least one specular bead 4 (at least one of "one or more high refractive index glass beads" and "one or more specular beads") (for example, clear or color clear resin coating material) is applied, at least one high refractive index glass bead and/or at least one specular bead 4 is partially exposed on the resin layer 13 of the coating material 12 (an example shown in FIG. 5A) or embedded in the resin layer 13 of the coating material 12 (an example shown in FIG. 5B). In this manner, holding all or part of a bead by a resin layer of a coating material easily makes it possible to place the bead in any position and enables specular reflection. Examples of the coating material 12 include, but are not limited to, acrylic coating materials, silicon coating materials, and urethane coating materials. In a case where the number of at least one high refractive index glass bead and/or at least one specular bead 4 is two or more, at least one high refractive index glass bead and/or at least one specular bead 4 may be partially exposed on a surface of the resin layer 13 of the coating material 12, and at least one of the rest of the high refractive index glass beads and/or the specular beads 4 may be embedded in the resin layer 13 of the coating material 12.

Figure 6A:
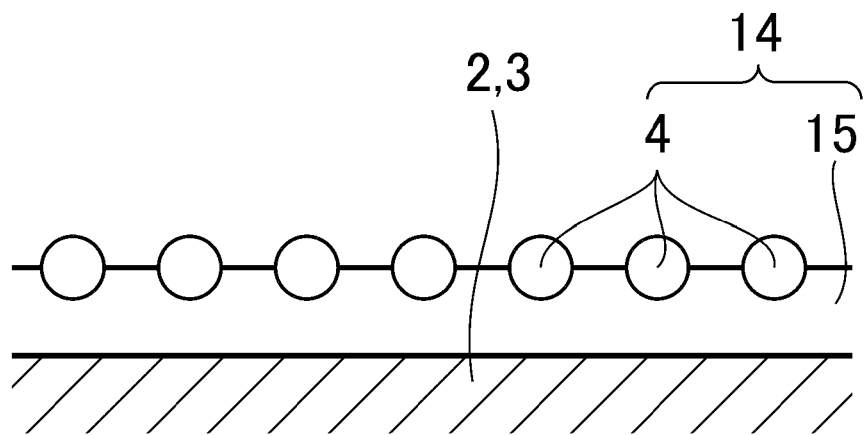
FIGS. 6A and 6B are views for describing a tape member in a fishing lure 1 according to an embodiment of the disclosure.
Figure 6B:
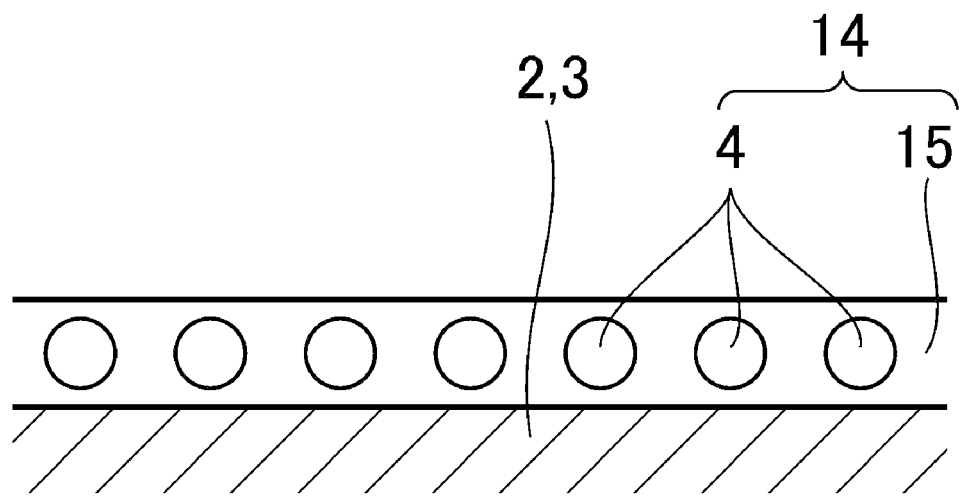

With reference to FIGS. 6A and 6B, hereinafter described is a tape member 14 containing at least one high refractive index glass bead and/or at least one specular bead 4. In the fishing lure 1 according to an embodiment of the disclosure, in a case where the tape member 14 containing at least one high refractive index glass bead and/or at least one specular bead 4 (at least one of "one or more high refractive index glass beads" and "one or more specular beads") is attached, at least one high refractive index glass bead and/or at least one specular bead 4 is exposed on the resin layer 15 of the tape member 14 (an example shown in FIG. 6A) or embedded in the resin layer 15 of the tape member 14 (an example shown in FIG. 6B). In this manner, it is possible to place a bead very easily as compared with painting. Examples of the tape member 14 include, but are not limited to, acrylic resin, polyethylene resin, polyester resin, and urethane resin. In a case where the number of at least one high refractive index glass bead and/or at least one specular bead 4 is two or more, at least one high refractive index glass bead and/or at least one specular bead 4 may be partially exposed on a surface of the resin layer 15 of the tape member 14, and at least one of the rest of the high refractive index glass beads and/or the specular beads 4 may be embedded in the resin layer 15 of the tape member 14.

In the fishing lure 1 according to an embodiment of the disclosure, the main body portion 2 is formed by resin (such as ABS and acrylic resin) or a metal (such as zinc, lead, and tungsten). A part of the main body portion 2 may be formed by at least one of resin (such as ABS and acrylic resin) and a metal (such as zinc, lead, and tungsten).

Examples of the lure herein include Egi lure, jig, jig head, Tenya, spoon, and weight. In this manner, appropriately providing a lure with at least one high refractive index glass bead and/or at least one specular bead configured to reflect light that enters an outer surface of the bead from many directions makes it possible to send reflected light reliably to a fish eater even when the lure is a jig, Tenya, or a spoon. Accordingly, it is possible to enhance the fish attracting effect significantly. In addition, a fishing lure according to another embodiment of the disclosure may be solid. In this case, the lure is formed not to have an interior portion provided with a cavity portion. Alternatively, a fishing lure according to another embodiment of the disclosure may be provided with a cavity portion in at least a part of the lure.

Dimensions, materials, and arrangements of the components described herein are not limited to those expressed in the embodiments and may be changed within the scope of the disclosure. A component that is not expressed herein may be added to the embodiments, and some of the components described in the embodiment may be omitted.

REFERENCE SIGNS LIST

1 Lure
2 Main body portion
3 Bead holding member
4 High refractive index glass beads or specular beads
11 Cavity (cavity portion)
12 Coating material
13 Resin layer
14 Tape member
15 Resin layer

What is claimed is:

1. A lure for fishing comprising a main body portion having an interior portion with a cavity and having at least one high refractive index glass bead and/or at least one specular bead, wherein
   the cavity is partially or completely visible from outside the lure,
   the at least one high refractive index glass bead and/or the at least one specular bead is inside the cavity,
   the at least one high refractive index glass bead and/or the at least one specular bead is configured to reflect the external light,
   a bead holding member is inside the cavity, and
   a coating material containing the at least one high refractive index glass bead and/or the at least one specular bead is applied is attached to a front surface of the bead holding member or a tape member containing the at least one high refractive index glass bead and/or the at least one specular bead is attached to the front surface of the bead holding member.

2. The lure according to claim 1, wherein the at least one high refractive index glass bead and/or the at least one specular bead is enclosed in the cavity.

3. The lure according to claim 1, where the coating material containing the at least one high refractive index glass bead and/or the at least one specular bead is applied to the front surface of the bead holding member, and the at least one high refractive index glass bead and/or the at least one specular bead is partially exposed on a resin layer of the coating material or embedded in the resin layer of the coating material.

4. The lure according to claim 1, where the tape member containing the at least one high refractive index glass bead and/or the at least one specular bead is attached to the front surface of the bead holding member, and the at least one high refractive index glass bead and/or the at least one specular bead is partially exposed on a resin layer of the tape member or embedded in the resin layer of the tape member.

5. The lure according to claim 1, wherein the high refractive index glass bead is a spherical reflective bead having a refractive index of from 1.4 to 2.6.

6. The lure according to claim 1, wherein the specular bead has a tetrahedral, hexahedral, octahedral, dodecahedral, or icosahedral shape.

7. The lure according to claim 1, wherein the high refractive index glass bead is formed by soda lime glass, heat-resistant glass, quartz glass, hard glass, borosilicate glass, or titanium barium glass.

8. The lure according to claim 1, wherein the specular bead is formed by soda lime glass, heat-resistant glass, quartz glass, hard glass, borosilicate glass, titanium barium glass, ABS resin, or acrylic resin.

* * * * *